US010396548B2

(12) United States Patent
Nickerson et al.

(10) Patent No.: US 10,396,548 B2
(45) Date of Patent: Aug. 27, 2019

(54) PNEUMATICALLY OPERABLE CURRENT PROTECTION DEVICE FOR A FAULT CURRENT LIMITER

(71) Applicant: Varian Semiconductor Equipment Associates, Inc., Gloucester, MA (US)

(72) Inventors: Scott W. Nickerson, Plaistow, NH (US); Charles L. Stanley, Amesbury, MA (US); David Morrell, Wakefield, MA (US); Semaan Fersan, Hamilton, MA (US); Saeed Jazebi, Peabody, MA (US); George Emmanuel, Peabody, MA (US)

(73) Assignee: VARIAN SEMICONDUCTOR EQUIPMENT ASSOCIATES, INC., Gloucester, MA (US)

( * ) Notice: Subject to any disclaimer, the term of this patent is extended or adjusted under 35 U.S.C. 154(b) by 271 days.

(21) Appl. No.: 15/418,911

(22) Filed: Jan. 30, 2017

(65) Prior Publication Data

US 2018/0219372 A1    Aug. 2, 2018

(51) Int. Cl.
| *H02H 9/02* | (2006.01) |
| *H01B 5/02* | (2006.01) |
| *H01H 33/66* | (2006.01) |
| *H01H 71/10* | (2006.01) |

(52) U.S. Cl.
CPC ............. *H02H 9/02* (2013.01); *H01B 5/02* (2013.01); *H01H 33/66* (2013.01); *H01H 71/10* (2013.01)

(58) Field of Classification Search
CPC . H02H 9/02; H01B 5/02; H01H 33/66; H01H 71/10
See application file for complete search history.

(56) References Cited

U.S. PATENT DOCUMENTS

| 4,434,332 A | * | 2/1984 | Yanabu | H01H 33/143 218/144 |
| 4,553,117 A | * | 11/1985 | Schubring | H01H 50/88 335/59 |
| 5,343,444 A | * | 8/1994 | Agut Sanz | H01H 43/28 188/298 |
| 2009/0201617 A1 | * | 8/2009 | Yamaguchi | H01H 9/40 361/93.9 |
| 2012/0049995 A1 | | 3/2012 | Murray | |
| 2013/0299321 A1 | | 11/2013 | Berard et al. | |
| 2015/0055260 A1 | | 2/2015 | Tekletsadik et al. | |

(Continued)

FOREIGN PATENT DOCUMENTS

| EP | 2947675 A1 | 11/2015 |
| JP | 11-234894 A | 8/1999 |

*Primary Examiner* — Scott Bauer (57) ABSTRACT

Embodiments of the disclosure provide a current protection device for a fault current limiter, the current protection device including a detection circuit electrically coupled between a current transformer and a pneumatic timer, and an electrical vacuum interrupter (EVI) coupled to a pneumatic cylinder. In some embodiments, the EVI includes a set of breaker contacts, wherein the pneumatic timer is communicatively coupled with the pneumatic cylinder to actuate a moveable contact of the set of breaker contacts. In some embodiments, the detection circuit is configured to detect a current of the current transformer, and to provide a control signal to the pneumatic cylinder to open or close the set of breaker contacts based on the detected current.

17 Claims, 5 Drawing Sheets

(56) References Cited

U.S. PATENT DOCUMENTS

2015/0116881 A1\* 4/2015 Burnett ................ H01H 9/542
  361/93.1
2015/0294819 A1\* 10/2015 Opfer .................... H01H 33/64
  218/90

\* cited by examiner

PNEUMATICALLY OPERABLE CURRENT PROTECTION DEVICE FOR A FAULT CURRENT LIMITER

FIELD

This disclosure relates to current protection devices, and more particularly to a pneumatically operable current protection device for use with a fault current limiter.

BACKGROUND

A fault current limiter (FCL) is a device for limiting fault currents, such as in a power system. Various types of FCLs have been developed over the last several decades, including superconducting fault current limiters (SCFCLs), solid state fault current limiters, inductive fault current limiters, as well as other varieties known in the art. FCLs may be implemented in a system having generation, transmission, and distribution networks for providing power to various industrial, commercial, and/or residential electrical loads.

A fault current is an abnormal current in an electrical system resulting from a fault in the system, such as a short circuit. A fault current may arise in a system due to any number of events or failures, such as power lines or other system components being damaged by severe weather (e.g. lightning strikes). When such a fault occurs, a large current (a fault current) can quickly appear in the circuit as the current is no-longer limited by load. This surge of current is undesirable because of potential damage to the load, including the network itself, or equipment connected to the network. With respect to these and other considerations the present disclosure is provided.

BRIEF SUMMARY

A fault current limiter according to an embodiment of the present disclosure includes a detection circuit electrically coupled between a current transformer and a pneumatic timer, and a set of breaker contacts coupled to a pneumatic cylinder. The pneumatic timer may be communicatively coupled with the pneumatic cylinder to actuate a moveable contact of the set of breaker contacts.

A current protection device according to embodiments of the disclosure includes a detection circuit electrically coupled between a current transformer and a pneumatic timer, and an electrical vacuum interrupter (EVI) coupled to a pneumatic cylinder, the EVI including a set of breaker contacts. The pneumatic cylinder may actuate a moveable contact of the set of breaker contacts based on a current greater than a threshold level being detected by the detection circuit.

A method for limiting a fault current according to embodiments of the disclosure includes electrically coupling a detection circuit between a current transformer and a pneumatic timer, coupling an electrical vacuum interrupter (EVI) to a pneumatic cylinder, wherein the EVI includes a set of breaker contacts operable with the pneumatic timer. The method further includes detecting, by the detection circuit, a current of the current transformer, and providing a control signal to the pneumatic cylinder to actuate a moveable contact of the set of breaker contacts based on the current detected by the detection circuit.

BRIEF DESCRIPTION OF THE DRAWINGS

The accompanying drawings illustrate exemplary approaches of the disclosure, including the practical application of the principles thereof, as follows.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

As used herein, an element or operation recited in the singular and proceeded with the word "a" or "an" are understood as possibly including plural elements or operations, except as otherwise indicated. Furthermore, references to "one embodiment" or "some embodiments" of the present disclosure may be interpreted as including the existence of additional embodiments also incorporating the recited features.

The present embodiments provide a current protection device for a fault current limiter, the current protection device including a detection circuit electrically coupled between a current transformer and a pneumatic timer, and an electrical vacuum interrupter (EVI) coupled to a pneumatic cylinder. In some embodiments, the EVI includes a set of breaker contacts, wherein the pneumatic timer is communicatively coupled with the pneumatic cylinder to actuate a moveable contact of the set of breaker contacts. In some embodiments, the detection circuit is configured to detect a current of the current transformer, and to provide a control signal to the pneumatic cylinder to open or close the set of breaker contacts based on the detected current.

Figure 1:
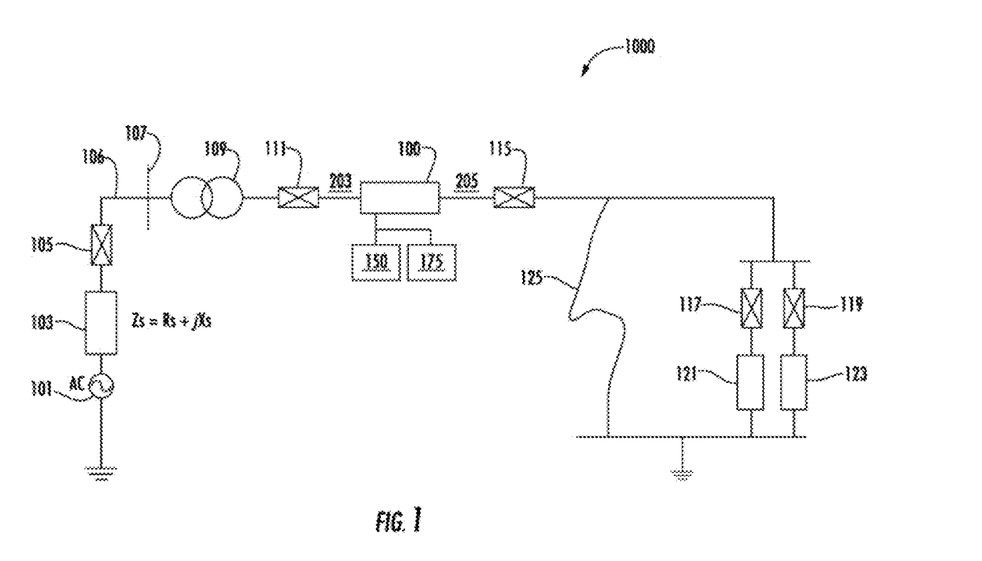
FIG. 1 depicts fault current limiting (FCL) system in accordance with embodiments of the disclosure.

FIG. 1 shows a fault current limiter (FCL) or fault current limiter circuit 100, implemented in a power transmission and distribution system 1000. In general, the FCL circuit 100 may be configured to protect a variety of circuits and/or loads from short circuit fault currents in various power systems such as, for example, transmission, distribution and generation networks.

A power source 101 may supply power through interface circuit 103 having a complex impedance $Z_s$ including a real component $R_s$ and imaginary component $X_s$, and circuit breaker 105. Power transmission line 106 may lead to an interface 107 with a substation having a transformer 109 configured to step the transmission line voltage to a voltage compatible with electrical loads 121/123. Output of transformer 109 may be coupled to breaker 111, such as a circuit breaker, as well as to the conductor 203 and/or 205, and the FCL circuit 100. FCL circuit 100 may be coupled through breaker 115, such as a circuit breaker, and matching circuits 117, 119 to electrical loads 121/123. Additional loads and matching circuits may be provided in other embodiments. A short circuit fault 125 may exist and, if present, will be isolated by operation of various embodiments described herein.

The FCL circuit 100 can be electrically connected in series to a power source 101 and one or more electrical loads 121, 123 via conductors 203 and 205. In one embodiment, a current sensor 150 may be coupled to and/or in association with a controller 175, the controller 175 having a memory and at least one processor device. Either the controller 175 and/or the current sensor 150 may be coupled to the FCL circuit 100. One of ordinary skill in the art will appreciate the FCL circuit 100 may be implemented in a variety of other applications and power system configurations. The particular power system depicted in FIG. 1 is therefore shown by way of example and is not intended to be limiting.

In some embodiments, the FCL circuit 100 may be implemented in applications where fault protection for the $1^{st}$ peak of the fault is not critically needed. For example, the FCL circuit 100 may be configured to limit the fault current quickly (e.g., within a half a cycle) of the occurrence of the fault condition. In some examples, the FCL circuit 100 may be configured to sense and limit fault currents within less than a cycle (e.g., <17 ms for 60 Hz system, <20 ms for 50 HZ system, or the like). As will be appreciated, a circuit breaker in some embodiments may take more than 3 cycles to sense and limit a fault. As such, systems capable of tolerating the $1^{st}$ peak fault current may be particularly suited to protection using the FCL circuit 100.

Turning now to FIGS. 2-5, exemplary FCL circuits 100 arranged according to various embodiments of the present disclosure will be described in greater detail. Each of the FCL circuits 100 depicted in FIGS. 2-5 may include a current protection device 110, as will be described in greater detail with reference to FIG. 6. In general, the current protection device 110 is a switch mechanism including a set of breaker contacts, at least one of breaker contact of the set of breaker contacts being actuable by a pneumatic cylinder to open the switch and limit the current. Once the current protection device 110 opens, the current may then be transferred to a parallel connected shunt device (e.g., voltage control reactor, or the like) and the fault current is not received by the electrical loads 121/123 (FIG. 1).

Figure 2:
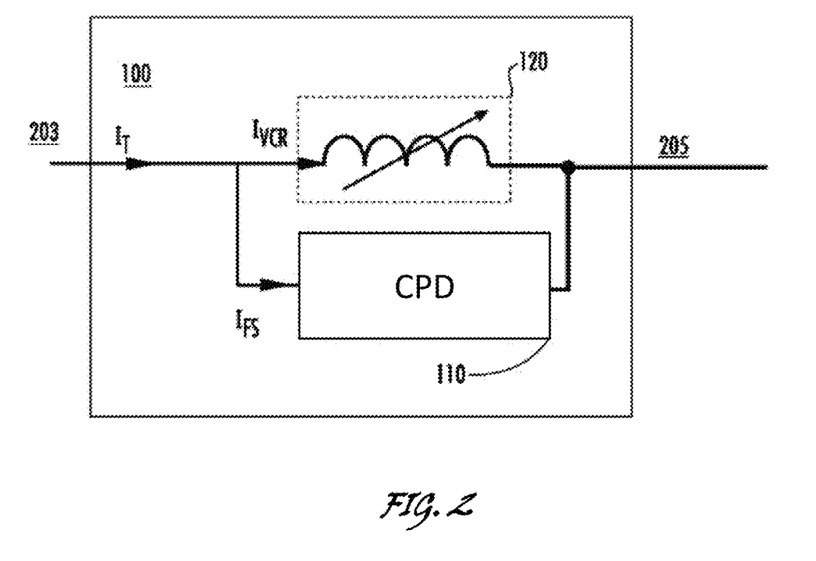
FIG. 2 depicts a FCL circuit including a current protection device and a voltage control reactor (VCR) in accordance with embodiments of the disclosure.

FIG. 2 depicts the FCL circuit 100 having the current protection device 110 and a voltage control reactor (VCR) 120. The current protection device 110 and the VCR 120 are electrically connected in parallel. During steady state operation of the FCL circuit 100 (e.g., when no fault currents are detected), current ("$I_T$") will flow in to the FCL circuit 100 from the conductor 203, and through the current protection device 110. Incoming system current $I_T$ is split between a first component $I_{VCR}$ flowing through VCR 120, and a current $I_{FS}$ through the current protection device 110. More specifically, during steady state operation the switch contact in current protection device 110 will be closed. As such, the current protection device 110 will conduct current from the conductor 203 to the conductor 205, in effect transmitting power from the source to the electrical loads 121/123. When a current fault is detected, the current protection device 110 will open, forcing the current through the parallel connected VCR 120. The VCR 120 acts to shunt and/or limit the current flowing from the source to the electrical loads 121/123. In other words, during fault current conditions the fast switch will open and the current $I_T$ will be forced to flow through the VCR 120.

Figure 3:
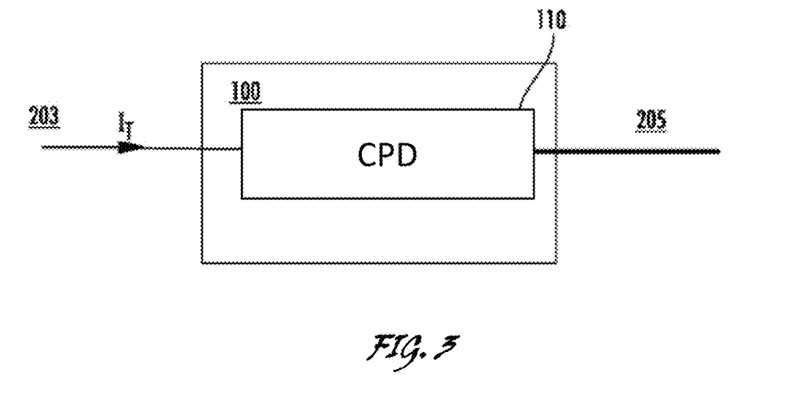
FIG. 3 depicts a FCL circuit having a current protection device minus a voltage control reactor (VCR) in accordance with embodiments of the disclosure.

FIG. 3 depicts the FCL circuit 100 having the current protection device 110 minus the VCR 120. In this embodiment, the current protection device 110 may be used as an interrupter. For example, during steady state operation of the FCL circuit 100 (e.g., no fault currents detected), current $I_T$ will flow in to the FCL circuit 100 from the conductor 203, and through the current protection device 110. More specifically, during steady state operation, the switch contact in current protection device 110 will be closed. As such, the current protection device 110 may conduct current from the conductor 203 to the conductor 205, in effect transmitting power from the source to the electrical loads 121/123. When a current fault is detected, the current protection device 110 will open, limiting or interrupting the current flowing from the source to the electrical loads 121/123. In other words, during fault current conditions the switch will open and the current $I_T$ will be limited, i.e., an open circuit will be created.

Figure 4:
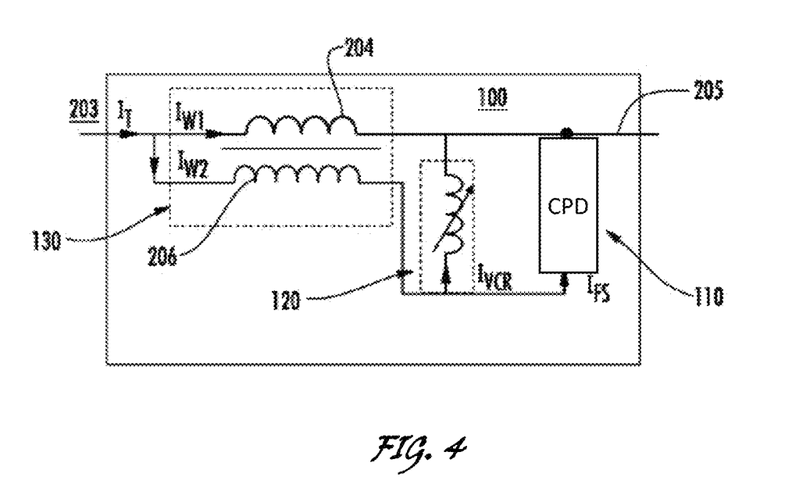
FIG. 4 depicts another FCL circuit having a current protection device, a VCR, and a current splitting reactor (CSR) in accordance with embodiments of the disclosure.

Turning now to FIG. 4, another exemplary embodiment of the FCL circuit 100 is depicted. The FCL circuit 100 includes the current protection device 110 and the VCR 120. In some examples, such as for high load current applications, the FCL circuit 100 may also include a current splitting reactor (CSR) 130. The CSR 130 may be configured to reduce steady state current handling needs so a less complex and/or lower cost and/or lower current protection device 110 can be used. In some examples, the FCL circuit 100 depicted in FIG. 4 may be used for circuits carrying 1 kAmps or greater (e.g., power transmission and/or power distribution). The CSR 130 may include a first conductive winding 204 and a second conductive winding 206. Second conductive winding 206 may be counter-wound with respect to first conductive winding 204. The CSR 130 may include the first conductive winding 204 and the second conductive windings 206 configured to exhibit minimal impedance during a steady state operation and a comparatively larger impedance during a fault condition to effectively limit the fault current. CSR 130 may be used to manage high system currents so a smaller proportion of the normal/steady state and fault currents flow through the FCL circuit 100. In this embodiment, incoming system current $I_T$ is split between a first component $I_{W1}$ flowing through the first conductive winding 204, and a second component $I_{W2}$ flowing through the second conductive winding 206. $I_{W2}$ may be further split between a current $I_{VCR}$ flowing through VCR 120 and a current $I_{FS}$ through the current protection device 110.

In one embodiment, the first conductive winding 204 may be electrically connected in a reverse-parallel relationship with the second conductive winding 206. For example, current entering the CSR 130 is directed through the first conductive winding 204 in a first direction and through the second conductive winding 206 in a second, opposite direction. In one embodiment, the current flowing through the first conductive winding 204 may therefore be equal to the current flowing through the second conductive winding 206. Because the first conductive winding 204 and the second conductive winding 206 are arranged in the above-described reverse-parallel configuration, the conductive windings will be magnetically-coupled and will exhibit a negligible net and/or equivalent impedance in some embodiments. The first conductive winding 204 and the second conductive winding 206 may be wound around a magnetic core, such as, for example, in a bifilar coil arrangement. Other winding arrangements are available for use and may be applied depending on preference and/or technological requirements. One of ordinary skill in the art will contemplate the core may be an iron core or an air core having dimensions dictated by the current limiting requirements of a particular application.

By using the first conductive winding 204 and the second conductive winding 206 having an appropriate numbers of turns, the steady state operation of the FCL circuit 100 may be tailored to distribute steady state current along parallel paths $I_{W1}$ and $I_{W2}$. In one embodiment, the steady state current is distributed such that if x % of the steady state current flows along path $I_{W1}$ the remainder (100−x) % of the steady state current flows along path $I_{W2}$. Alternatively, if x % of the steady state current flows along path $I_{W2}$ then the remainder (100−x) % of the steady state current flows along path $I_{W1}$. Thus, during a steady state operation (e.g., steady state condition), the first conductive winding 204 and the second conductive winding 206 of the CSR 130 may be set to distribute the steady state current along parallel paths $I_{W1}$ and $I_{W2}$ in a predefined manner.

In one embodiment, for example, first conductive winding 204 and the second conductive windings 206 may be selected with appropriate numbers of turns for evenly distributing the current in the FCL circuit 100 between the paths $I_{W1}$ and $I_{W2}$ so the current may be distributed so 50% flows along path $I_{W2}$ and 50% flows along path $I_{W1}$. In other embodiments, the ratio may be set to 40% flowing along path $I_{W2}$ and 60% flowing along path $I_{W1}$; 30% flowing along path $I_{W2}$ and 70% flowing along path $I_{W1}$. In other words, the ratio may be set to 40/60, 30/70, 20/80, for example, along respective paths $I_{W1}$ and $I_{W2}$. In some cases, where current distribution is to be set more precisely, an external tuning winding (not shown) can implemented as an optional device.

During the steady state operations of the FCL circuit 100, the CSR 130, along with the first conductive winding 204 and the second conductive windings 206, cancels the magnetic field inside the core of the current splitting reactor. More specifically, the current splitting device splits the steady state current (e.g., system current $I_T$) into two branches ($I_{W1}$ and $I_{W2}$) flowing through the first conductive winding 204 and the second conductive windings 206 in opposite directions to produce a net zero or negligible magnetic field resulting in a negligible equivalent or net impedance in the circuit. The reactance of the first conductive winding 204 is therefore mostly negated by the oppositely-directed reactance of the second conductive winding 206. Thus, by selecting first conductive winding 204 and the second conductive windings 206 having appropriate numbers of turns, a predetermined portion of steady state current can be routed through the CSR 130. The steady state current load on the FCL circuit 100 is reduced relative to conventional FCL systems. The cost and physical size of the FCL system can therefore also be reduced.

During steady state operation of the FCL circuit 100, the CSR 130 splits current into two branches flowing through the first conductive winding 204 and the second conductive winding 206 in opposite directions to produce a net zero or negligible magnetic field resulting in negligible equivalent or net impedance in the circuit. The reactance of the first winding 204 is therefore mostly negated by the oppositely directed reactance of the second conductive winding 206. Thus, by selecting first conductive winding 204 and the second conductive windings 206 having appropriate numbers of turns, a predetermined portion of steady state current can be routed through the current protection device 110. The steady state current load on the FCL circuit 100 is reduced relative to the total system load current. The cost and physical size of the FCL circuit 100 can therefore also be reduced.

Upon the occurrence of a fault condition, the FCL circuit 100 is driven into a fault state wherein the current protection device 110 opens and the impedance exhibited by the FCL circuit 100 increases. Furthermore, during the fault condition, the proportion of current through the second winding and the current protection device 110 in parallel with the VCR 120 is significantly reduced relative to the first winding 204 compared to the proportion of the currents during steady state operation. Thus, the first conductive winding 204 and the second conductive windings 206 will no longer produce equal and opposing magnetic fields and will lose their strong magnetic coupling. The windings will therefore exhibit a higher equivalent or net current limiting impedance relative to steady state operation limiting the fault current in the system.

In some examples, the first conductive winding 204 and the second conductive windings 206 in the CSR 130 may be 3:1. More particularly, the second conductive windings 206 may have 3 times as many turns than the first conductive winding 204. As such, during normal operation approximately 25% of the current will flow through the current protection device 110.

Figure 5:
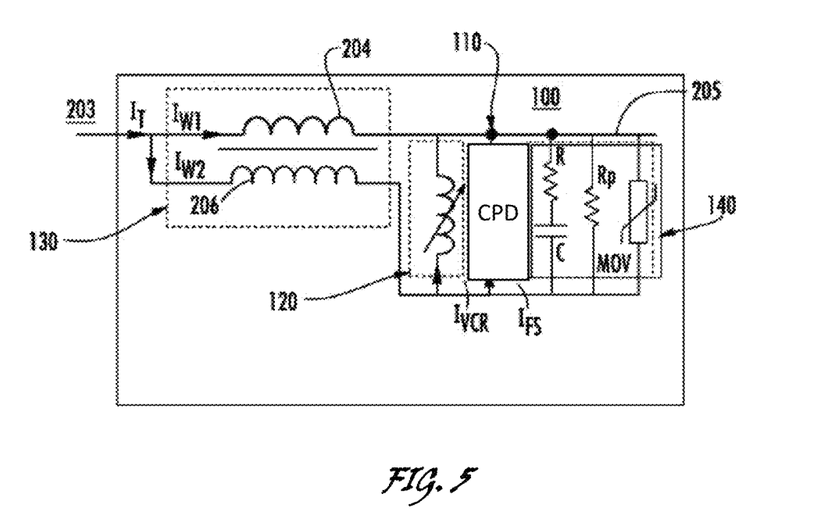
FIG. 5 depicts another FCL circuit having a current protection device, VCR, CSR, and a transient overvoltage control circuit in accordance with embodiments of the disclosure.

FIG. 5 illustrates an exemplary embodiment of the FCL circuit 100. The FCL circuit 100 includes the current protection device 110, the VCR 120, and in some examples, the FCL circuit 100 may also include a transient overvoltage control circuit (TOCC) 140. In general, the TOCC 140 is a transient overvoltage suppression circuit including a parallel connection of a series resistance and capacitance (RC) circuit (resistance labeled as R and capacitors labeled as C), a resistance (labeled as Rp), and a snubber circuit (e.g., metal oxide varistor (labeled as MOV), or the like). In some examples, the TOCC 140 may use high capacitance and resistance values, such as, for instance, a time constant of >100 μs (R*C>100 μs) may be used. The TOCC 140, having high values of capacitances and resistances, may facilitate suppression of the transient overvoltages in high inductance circuits.

Figure 6:
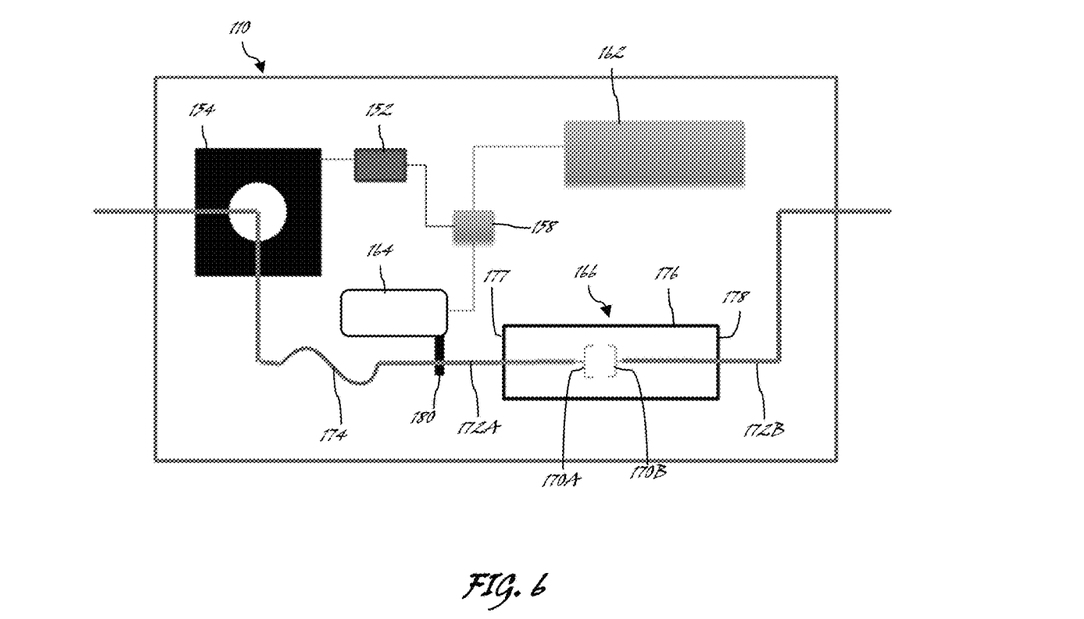
FIG. 6 depicts a CPD in accordance with embodiments of the disclosure.

Turning now to FIG. 6, the current protection device 110 according to exemplary embodiments of the disclosure will be described in greater detail. As shown, the current protection device 110 may include a detection device or circuit 152 electrically coupled between a current transformer 154 and a pneumatic timer 158. In some embodiments, the pneumatic timer 158 may include memory and at least one processing device. The pneumatic timer 158 is further electrically/communicably coupled with an air supply 162 and a pneumatic cylinder 164, wherein the processing device of the pneumatic timer 158 may control operation of the air supply 162 and/or the pneumatic cylinder 164 according to an input signal transmitted from the current transformer 154.

The current protection device 110 may further include an electrical vacuum interrupter (EVI) 166 having a set of breaker contacts 170A-B extending from corresponding first and second terminals 172A-B, wherein the set of breaker contacts 170A-B and at least a portion of the first and second terminals 172A-B are positioned within a housing 176 of the EVI 166. As shown, at least one contact (e.g., breaker contact 170A) of the set of breaker contacts 170A-B may be moveable with respect to the other breaker (e.g., breaker contact 170B) and the housing 176.

During use, the detection circuit 152, e.g., a current/voltage detector, may read a signal from the current transformer 154 and determine if the current is above a specified threshold. In the event the threshold is exceeded, the detection circuit 152 may send a signal to the pneumatic timer 158 to activate the pneumatic cylinder 164, thus breaking the continuity of the circuit by separating the set of breaker contacts 170A-B. In some embodiments, the pneumatic timer 158 may then hold the set of breaker contacts 170A-B open for a predetermined time, for example, to allow a superconducting tape (not shown) to return to its superconducting state minus the burden of continuous current flowing through the superconducting tape. After the predetermined time, the pneumatic timer 158 may allow air pressure to be released from the pneumatic cylinder 164, causing the set of breaker contacts 170A-B to close and current to flow through the current protection device 110, for example, through a flexible bus bar 174 coupled between the current transformer 154 and the first terminal 172A.

In some non-limiting embodiments, the EVI 166 may be an insulating enclosure or housing 176 including respective end plates, end plate 177 and end plate 178. The set of breaker contacts 170A-B are disposed centrally of a vacuum chamber formed by the housing 176. As shown, each of the set of breaker contacts 170A-B is mounted at an end of each respective first and second terminal, that is, first terminal 172A and second terminal 172B. In some embodiments, the first terminal 172A may be actuable through an opening in the end plate 177. In other embodiments, the second terminal 172B may be also be actuable through an opening in the end plate 178.

As further shown, the first terminal 172A may be mechanically/physically coupled to a lever arm 180 of the pneumatic cylinder 164 for opening or closing the set of breaker contacts 170A-B of the EVI 166. For example, during use, the lever arm 180 is fixedly secured to the first terminal 172A so activation of the pneumatic cylinder 164 causes movement of the lever arm 180 and therefore the first terminal 172A relative to the second terminal 172B. Movement of the first terminal 172A and the lever arm 180 may break the continuity of the circuit by separating the set of breaker contacts 170A-B. In some embodiments, the pneumatic timer 158 causes the lever arm 180 to move laterally away from the EVI 166 and towards the current transformer 154, holding the set of breaker contacts 170A-B open for a predetermined time. Conversely, the pneumatic timer 158 may also cause the lever arm 180 to move laterally towards EVI 166 when air pressure is released from the pneumatic cylinder 164, thus causing the set of breaker contacts 170A-B to close.

Figure 7:
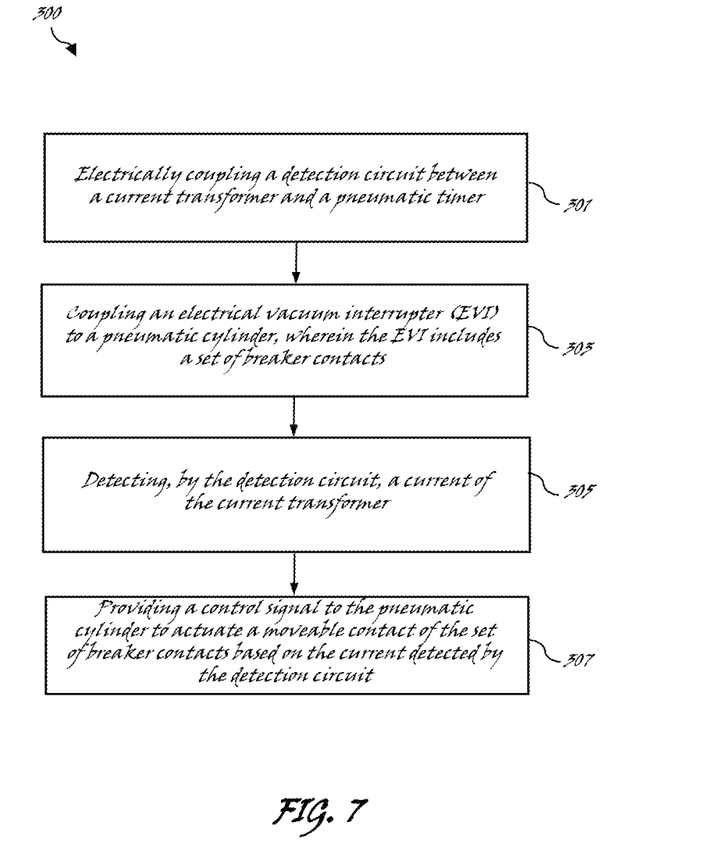
FIG. 7 depicts a method for providing fault current protection in accordance with embodiments of the disclosure.

Turning now to FIG. 7, a method 300 for limiting a fault current according to embodiments of the present disclosure will be described in greater detail. Specifically, at block 301, the method 300 may include electrically coupling a detection circuit between a current transformer and a pneumatic timer. In some embodiments, the detection circuit is a current (I)-voltage (V) circuit configured to receive a signal or indication of a current from the current transformer. In some embodiments, the current transformer and the pneumatic timer are connected in series. In some embodiments, an air supply (e.g., an air tank) may be coupled with the pneumatic timer and the pneumatic cylinder.

At block 303, the method 300 may include coupling an EVI to a pneumatic cylinder, wherein the EVI includes a set of breaker contacts housed therein. In some embodiments, the EVI further includes a pair of terminals extending from opposite end plates, wherein at least one terminal of the pair of terminals is moveable with respect to the other terminal of the pair of terminals. By actuating one or more of the pair of terminals, the set of breaker contacts may be opened and closed.

At block 305, the method 300 may include detecting, by the detection circuit, a current of the current transformer. In response to the current detected, a control signal may be provided to the pneumatic cylinder to actuate a moveable contact of the set of breaker contacts, as shown at block 307. In some embodiments, the set of breaker contacts is opened based on the current detected by the detection circuit being greater than a predetermined threshold.

In sum, various embodiments described herein provide a pneumatically timed and actuated current protection device for use as part of a fault current limiter system. A first advantage of the embodiments of the disclosure includes the ease of integration into most power transmission and distribution systems by eliminating the use of large solenoid coils and mechanical timing mechanisms. A second advantage of the embodiments of the disclosure includes increased control and reliability because, unlike prior art approaches, there is no low limit to the current capable of actuating the pneumatic cylinder and lever arm. Instead, the EVI of the present disclosure is capable of generating a full stroke independent of the fault current threshold. A third advantage of the embodiments of the disclosure includes the ability to quickly close the set of breaker contacts within the EVI, thus minimizing the welding effect potentially occurring inside the EVI housing.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A fault current limiter comprising:
a detection device electrically coupled between a current transformer and a pneumatic timer;
a set of breaker contacts coupled to a pneumatic cylinder, wherein the pneumatic timer is communicatively coupled with the pneumatic cylinder to actuate a moveable contact of the set of breaker contacts; and
an air supply, wherein the pneumatic timer is electrically coupled between the air supply and the pneumatic cylinder to control operation of the pneumatic cylinder and the air supply in response to a signal transmitted from the current transformer.

2. The fault current limiter of claim 1, further comprising a flexible bus bar coupling the moveable contact to the current transformer.

3. The fault current limiter of claim 1, wherein the detection device is a current-voltage (I-V) circuit.

4. The fault current limiter of claim 1, wherein the pneumatic cylinder has a lever arm mechanically coupled to the moveable contact for opening or closing the set of breaker contacts.

5. The fault current limiter of claim 1, further comprising an electrical vacuum interrupter (EVI), wherein the set of breaker contacts are operable within the EVI.

6. The fault current limiter of claim 5, further comprising a voltage control reactor (VCR) connected to the current transformer and the EVI, wherein the VCR is configured to receive a current in response to a break in current flowing through the EVI.

7. The fault current limiter of claim 6, further comprising a current splitting reactor (CSR) electrically connected to the current transformer and the EVI, the CSR used for current limiting, and the CSR and the VCR used to control a voltage.

8. A current protection device comprising:
   a detection circuit electrically coupled between a current transformer and a pneumatic timer;
   an electrical vacuum interrupter (EVI) coupled to a pneumatic cylinder, the EVI including a set of breaker contacts, wherein the pneumatic cylinder actuates a moveable contact of the set of breaker contacts based on a current greater than a threshold level being detected by the detection circuit;
   an air supply, wherein the pneumatic timer is electrically coupled between the air supply and the pneumatic cylinder to control operation of the pneumatic cylinder and the air supply in response to a signal transmitted from the current transformer.

9. The current protection device of claim 8, wherein the detection circuit is a current-voltage (I-V) circuit.

10. The current protection device of claim 8, wherein the set of breaker contacts are configured to open or close.

11. The current protection device of claim 8, wherein the pneumatic cylinder includes a lever arm mechanically coupled to the moveable contact for actuating the moveable contact.

12. The current protection device of claim 8, further comprising a flexible bus bar coupling the moveable contact to the current transformer.

13. The current protection device of claim 8, wherein the moveable contact of the set of breaker contacts extends from a terminal positioned partially within a housing of the EVI.

14. A method for limiting a fault current, the method comprising:
   electrically coupling a detection circuit between a current transformer and a pneumatic timer;
   coupling an electrical vacuum interrupter (EVI) to a pneumatic cylinder, wherein the EVI includes a set of breaker contacts operable with the pneumatic timer;
   detecting, by the detection circuit, a current of the current transformer;
   electrically coupling the pneumatic timer between an air supply and the pneumatic cylinder; and
   providing a control signal to the pneumatic timer to actuate a moveable contact of the set of breaker contacts based on the current detected by the detection circuit.

15. The method of claim 14, further comprising opening the set of breaker contacts based on the current detected by the detection circuit being greater than a predetermined threshold.

16. The method of claim 14, further comprising electrically connecting a voltage control reactor (VCR) connected to the current transformer and the EVI.

17. The method of claim 16, further comprising electrically connecting a current splitting reactor (CSR) to the current transformer and the EVI.

* * * * *